United States Patent Office 3,429,966
Patented Feb. 25, 1969

3,429,966
VACCINES AND ADJUVANTS THEREFOR
David Gall, London, England, assignor to Burroughs Wellcome & Co. (U.S.A.) Inc., Tuckahoe, N.Y., a corporation of New York
No Drawing. Filed Sept. 29, 1964, Ser. No. 400,207
Claims priority, application Great Britain, Oct. 1, 1963, 38,694/63
U.S. Cl. 424—92  9 Claims
Int. Cl. A61k 23/00

ABSTRACT OF THE DISCLOSURE

This invention is directed to a vaccine comprising a virus, or a protozoa, or a metazora, or a rickettsiae, or a bacteria, or a toxoid, and an adjuvant. In particular, the invention is directed to a vaccine comprising a nonpathogenic antigenic material selected from the class consisting of a virus, bacteria, protozoa, metazoa, rickettsiae, and toxoid, together with a nontoxic effective amount of an adjuvant selected from the class consisting of an organic base of the general Formula I $$A\text{—}[X]\text{—}A$$
$$\overset{|}{R} \qquad (I)$$

and a salt of the corresponding quaternized cation formed with a group selected from the class consisting of a hydrogen atom, one lower alkyl group and two lower alkyl groups, each of said alkyl groups having from 1 to 3 carbon atoms, wherein A is a higher aliphatic radical having from 12 to 22 carbon atoms, the residue [X] is selected from the class consisting of a nitrogen atom, a residue of the formula $$[\text{—NH—}\underset{|}{C}(\text{—Y})\text{—NH—}]$$

a residue of the formula $$[\text{—N}=C(\text{—Y})\text{—}\underset{|}{N}\text{—}]$$

and a residue of the formula $$[\text{—}\underset{|}{N}\text{—}C(:Q)\text{—NH—}]$$

in which Y is selected from the class consisting of a hydrogen atom, NRR, OR′, SR′ and R′, wherein R is selected from the class consisting of a hydrogen atom and lower alkyl of 1 to 3 carbon atoms, R′ being a lower alkyl of 1 to 3 carbon atoms and Q is selected from the class consisting of an oxygen atom, a sulphur atom, an imido and lower alkyl-imido having from 1 to 3 carbon atoms.

---

This invention relates to vaccines and vaccine adjuvants.

Vaccines are preparations of antigenic material for administration to induce in the recipient an immunity to infection or intoxication by a given infecting agent. Vaccines may be prepared from viruses, rickettsiae, bacteria, protozoa and metazoa. Inactivated vaccines may be sterile suspensions of the killed organisms or of toxoids or other antigenic material derived from the organisms, and are administered by injection. Vaccines may be either simple vaccines prepared from one species or variety of organism, or they may be mixed vaccines containing two or more simple vaccines. They are prepared in such a manner as not to destroy the antigenic material, although the methods of preparation vary, depending on the vaccine. The final products are distributed under aseptic conditions into sterile containers, which are then sealed so as to exclude contaminating microorganisms. A pharmaceutically acceptable bacteriostat may be added to sterile and inactivated vaccines, particularly if such vaccines are issued in containers sealed so as to permit the withdrawal of successive doses on different occasions.

Vaccine adjuvants are used to enhance the ability of the antigenic material in a vaccine to induce the desired immune response, and with many poorly antigenic materials the success of vaccination depends on the presence of a suitable adjuvant in the vaccine. The adjuvant is conveniently incorporated in the vaccine before the latter is distributed into containers, although it may be provided in a separate container for mixing with the antigenic material when the vaccine is required for use in immunising the recipient.

It has now been found that organic bases, which contain two higher aliphatic radicals, of the general Formula I $$A\text{—}[X]\text{—}A$$
$$\overset{|}{R} \qquad (I)$$

and their corresponding quaternised cations, with hydrogen or lower alkyl groups having 1 to 3 carbon atoms, are highly active as vaccine adjuvants.

In the Formula I, the groups A are the same or different and each is a higher aliphatic radical having from 12 to 22, preferably 16 to 22, carbon atoms, the residue [X] is a nitrogen atom or a residue of the formula $$[\text{—NH—}\underset{|}{C}(\text{—Y})\text{—NH—}]$$

or $$[\text{—N}=C(\text{—Y})\text{—}\underset{|}{N}\text{—}]$$

or $$[\text{—}\underset{|}{N}\text{—}C(:Q)\text{—NH—}]$$

in which Y is a hydrogen atom or a group of the formula NRR, OR′, SR′ or R′, the groups R being the same or different and each being a hydrogen atom or a lower alkyl group of 1 to 3 carbon atoms, the group R′ being a lower alkyl group of 1 to 3 carbon atoms, and Q is an oxygen atom, a sulphur atom or an imido or lower alkyl-amido group having from 1 to 3 carbon atoms. These cations corresponding to Formula I and bases of Formula I are more active as vaccine adjuvants than are similar cations and bases containing smaller aliphatic radicals or containing only one higher aliphatic radical.

The nature of the anion associated with a cation corresponding to Formula I is of little importance provided the anion is pharmacologically acceptable and provides a material containing the cation which has pharmaceutically acceptable physical properties.

The salts of these cations and the bases of Formula I are conveniently used in the form of solutions, dispersions or suspensions in a liquid carrier. The materials are generally not freely soluble in water but are soluble in many hydrocarbons and other organic solvents.

The bases of Formula I and the corresponding cations may be produced by the conventional chemical techniques for making amines, guanidines, isoureas, isothioureas and amidines and their cationic derivatives.

Two commercially available preparations that may be used for the purpose of the invention are sold as "Arquad 2HT" and "Arquad 2S" by Armour Hess Chemicals Ltd. These materials are said to contain cations of the formula A—N(CH$_3$)$_2$$^+$—A as the chlorides (75%), together with sodium chloride, (0.5%) propan-2-ol (18%) and water (6.5%), the higher aliphatic groups A comprising 24% hexadecyl, 75% octadecyl and 1% octadecenyl in "Arquad 2HT" and 24% hexadecyl, 4% octadecyl, 30% octadecenyl, and 42% octadecadienyl in "Arquad 2S."

The vaccine adjuvant containing a cation corresponding to Formula I or a base of Formula I is mixed with the nonpathogenic antigenic material to form a vaccine. The relative amounts needed of the adjuvant and the antigen preparation depend on the immunological characteristics of the antigen, and the total amounts of each needed per dose may also depend to some extent on the species and size of the recipient and the nature of the infection or intoxication to be immunised against. In small animals such as mice and guinea pigs it has been found that the amount of the adjuvant is preferably between 0.01 mg./dose and 1 mg./dose. In any case the dose to be used is one nontoxic to the recipient.

According to the invention therefore there is provided:
(a) A vaccine containing nonpathogenic antigenic material and a cation corresponding to Formula I or a base of Formula I;
(b) A process of inducing an immunity which comprises administering such a vaccine;
(c) a method of preparing such a vaccine which comprises mixing a preparation of nonpathogenic antigenic material with material containing a cation corresponding to Formula I or a base of Formula I;
(d) An immunising set comprising preparations of nonpathogenic antigenic material and a material containing a cation corresponding to Formula I or a base of Formula I, which may be in a separate container, to be used in a combined form as a vaccine containing both.

The following examples illustrate the invention.

EXAMPLE 1

An aqueous dispersion of "Arquad 2HT" containing 1.0 mg./ml. was made by warming the material at 70° C. in isotonic borate/succinate buffer pH 7.5. This buffer contained sodium borate $Na_2B_4O_7 \cdot 10H_2O$ (0.9% w./v.), succinic acid (0.29% w./v.) and sodium chloride (0.75% w./v.).

Diphtheria formol toxoid, prepared by treating purified diphtheria toxin with aqueous formaldehyde, was diluted in isotonic borate/succinate buffer pH 7.5 to contain 10 flocculation equivalents (10 Lf)/ml. To this solution was added an equal volume of the "Arquad 2HT" dispersion to produce a diphtheria vaccine.

The effectiveness of the vaccine was demonstrated in groups of 5 guinea pigs by administering the vaccine and later estimating the antibody levels induced. Each guinea pig was injected subcutaneously with two doses of 0.2 ml. of the vaccine 28 days apart. The guinea pigs were bled 10 days after the second dose, and the antibody titre against diphtheria was estimated by the guinea pig intracutaneous test. The dose of the antibody preparation required to protect the guinea pigs against the effect of a fixed dose of diphtheria toxin was compared with the dose of a standard preparation of diphtheria antitoxin required to give the same protection. The mean antibody titre was 13 units/ml., compared with a titre of less than 0.001 unit/ml. obtained with diphtheria toxoid without adjuvant.

EXAMPLE 2

An aqueous dispersion of "Arquad 2HT" containing 1.0 mg./ml. was made by warming the material at 70° C. in isotonic borate buffer pH 8.2. This buffer contained sodium borate $Na_2B_4O_7 \cdot 10H_2O$ (0.30% w./v.), boric acid (0.44% w./v.) and sodium chloride (0.76% w./v.).

Tetanus toxoid was diluted in isotonic borate buffer pH 8.2 to contain 0.5 Lf/ml. To this solution was added an equal volume of the "Arquad 2HT" dispersion to produce a tetanus vaccine.

The effectiveness of the vaccine was demonstrated in guinea pigs by the procedure described in Example 1. The antibody titre against tetanus was estimated by the mouse subcutaneous test, in a manner analogous to the method given in Example 1. The mean antibody titre was 2.0 units/ml. compared with a titre of less than 0.01 unit/ml. obtained with tetanus toxoid without adjuvant. In a similar test in which the vaccine was given to guinea pigs, the mean antibody titre was 4.57, compared with a titre of less than 0.05 unit/ml. obtained with tetanus toxoid without adjuvant and a titre of 0.05 unit/ml. obtained with a vaccine containing N,N,N-trimethyl-N-octadecylammonium chloride (50% solution) in place of the same amount of "Arquad 2HT."

EXAMPLE 3

Culture filtrates of *Clostridium perfringens* Type D (a strain causing pulpy kidney disease in sheep), grown so as to produce a high concentration of epsilon toxin, were treated with formaldehyde to convert the toxin into toxoid. The filtrate was diluted to contain approximately 150 unit-equivalents of epsilon toxoid per dose. "Arquad 2HT" was dispersed in the diluted vaccine to give a concentration of 0.10 mg./dose and produce a vaccine for immunising against enterotoxaemia due to *Clostridium perfringens* Type D. Sodium o-(ethylmercurithio)benzoate was incorporated at 0.01% w./v. as bacteriostat.

EXAMPLE 4

An aqueous dispersion of "Arquad 2HT" containing 1.33 mg./ml. was made by warming the material at 55° C. in isotonic phosphate buffer pH 7.3. This buffer contained potassium dihydrogen phosphate (0.27% w./v.) and sodium chloride (0.68%) brought to pH 7.3 with 1 N sodium hydroxide and sterilised.

An antigen preparation immunising against louping ill (an encephalitis of sheep caused by a tick-borne virus) was produced by infecting sheep intracerebrally with louping ill virus, harvesting the brain, spinal cord and spleen 4.5 days later, homogenising and centrifuging and treating the supernatant with 0.10% w./v. formaldehyde for 14 days. The resultant inactivated virus preparation was diluted 20-fold in isotonic phosphate buffer pH 7.3 and mixed with an equal volume of the "Arquad 2HT" dispersion. The resultant louping ill vaccine was allowed to stand for 48 hours and then bottled in 20 ml. amounts in multidose containers, incorporating 0.01% w./v. sodium o-(ethylmercurithio)benzoate as bacteriostat. An immunising dose of 2.0 ml. was required.

EXAMPLE 5

*Leishmania enriettii* (a protozoal species causing leishmaniasis in guinea pigs) was grown in the leptomonad form in glucose-saline overlying nutrient agar which contained 20% defibrinated horseblood. The flagellates were harvested from the culture medium and washed and resuspended in glucose-saline at $10^{8.0}$/ml. The suspension was then rapidly frozen and thawed three times to kill the flagellates. The resultant antigen preparation was mixed with an equal volume of an aqueous dispersion of "Arquad 2HT" (5.0 mg./ml.) to produce a leishmaniasis vaccine.

This vaccine, given to guinea pigs in two doses each of 0.2 ml. two weeks apart, protected challenge with leptomonads of *Leishmania enriettii*.

EXAMPLE 6

A vaccine was produced from the leptomonads of *Leishmania tropica major* (the causative agent of oriental sore in man) using the procedure described in Example 5.

The effectiveness of this vaccine was demonstrated in mice challenged with the leptomonads of *Leishmania tropica major*.

EXAMPLE 7

Antigen was prepared from trypanosomes separated from the blood of mice heavily infected with *Trypanosoma congolense* strain NIMR (a species causing disease in cattle). An agglutinating agent (conveniently an antiserum against mouse red cells or a phytohaemagglutinin) was added to the blood to agglutinate the red cells. Many trypanosomes remained in the supernatant and more were collected by washing the agglutinated red cells with cold glucose-saline. The trypanosomes were washed and resuspended in cold glucose-saline at $10^{8.0}$ trypanosomes/ml. The suspension was then rapidly frozen (using alcohol/solid carbon dioxide) and thawed three times to kill the trypanosomes remained in the supernatant and more were stored at −20° C. until required for use. A liquid vaccine was prepared by mixing the antigen preparation with an equal volume of an aqueous dispersion of "Arquad 2HT" (5.0 mg./ml.) to produce a trypanosomiasis vaccine.

This vaccine, given to mice in two doses each of 0.2 ml. two weeks apart, protected against challenge two weeks later with trypanosomes of *Trypanosoma congolense* strain NIMR.

EXAMPLE 8

Antigen was prepared from trypanosomes separated from the blood of mice infected with *Trypanosoma cruzi* strain Y (the causative agent of Chagas' disease in man), using the procedure described in Example 7. The parasitaemia in mice with *Trypanosoma cruzi* is much lower than with *Trypanosoma congolense*, however, and much less antigen was obtained. The antigen preparation containing $10^{6.8}$ dead trypanosomes/ml. was mixed with an equal volume of an aqueous dispersion of "Arquad 2HT" (5.0 mg./ml.) to produce a vaccine against Chagas' disease.

This vaccine, given to mice in two doses each of 0.2 ml. two weeks apart, protected against challenge two weeks later with trypanosomes of *Trypanosoma cruzi* strain Y.

EXAMPLE 9

An aqueous dispersion of "Arquad 2S" containing 1.0 mg./ml. in isotonic borate/succinate buffer pH 7.5 was made as described in Example 1. This was added to an equal volume of diphtheria toxoid solution (10 Lf/ml.) as described in Example 1 to produce a diphtheria vaccine.

The effectiveness of the vaccine was demonstrated in guinea pigs as described in Example 1. The mean antibody titre was 8 units/ml. compared with a titre of less 0.001 unit/ml. obtained with diphtheria toxoid without adjuvant.

EXAMPLE 10

An aqueous dispersion of "Arquad 2S" containing 1.0 mg./ml. in isotonic borate buffer pH 8.2 was made as described in Example 2. This was added to an equal volume of tetanus toxoid solution (0.5 Lf/ml.) as described in Example 2 to produce a tetanus vaccine.

The effectiveness of the vaccine was demonstrated in guinea pigs as described in Example 2. The mean antibody titre was 0.93, compared with a titre of less than 0.01 obtained with tetanus toxoid without adjuvant.

EXAMPLE 11

An aqueous suspension of N-methyl-N,N-dioctadecyl-amine containing 1.0 mg./ml. in isotonic borate/succinate buffer pH 7.5 was made and added to an equal volume of diphtheria toxoid solution (10 Lf/ml.) as described in Example 1 to produce a diphtheria vaccine.

When tested in guinea pigs, this vaccine induced a mean titre of 8.7 units/ml. diphtheria antitoxin.

EXAMPLE 12

An aqueous suspension of didodecyl-dimethyl ammonium chloride containing 1.0 mg./ml. in isotonic borate/succinate buffer pH 7.5 was made and added to an equal volume of diphtheria toxoid solution (10 Lf/ml.) as described in Example 1 to produce a diphtheria vaccine.

When tested in guinea pigs, this vaccine induced a mean titre of 0.048 unit/ml. diphtheria antitoxin.

EXAMPLE 13

An aqueous suspension of N,N′-didodecyl-N″-methyl-guanidine containing 1.0 mg./ml. in isotonic borate/succinate buffer pH 7.5 was made and added to an equal volume of diphtheria toxoid solution (10 Lf/ml.) as described in Example 1 to produce a diphtheria vaccine.

When tested in guinea pigs, this vaccine induced a mean titre of 7.2 units/ml. diphtheria antitoxin.

EXAMPLE 14

An aqueous suspension of N,N′-dihexadecyl-N″-methyl guanidine containing 1.0 mg./ml. in isotonic borate/succinate buffer pH 7.5 was made and added to an equal volume of diphtheria toxoid solution (10 Lf/ml.) as described in Example 1 to produce a diphtheria vaccine.

When tested in guinea pigs, this vaccine induced a mean titre of 2 units/ml. diphtheria antitoxin.

EXAMPLE 15

An aqueous suspension of dihexadecyl-methylamine containing 1.0 mg./ml. in isotonic borate/succinate buffer pH 7.5 was made and added to an equal volume of diphtheria toxoid solution (10 Lf/ml.) as described in Example 1 to produce a diphtheria vaccine.

When tested in guinea pigs, this vaccine induced a mean titre of 3 units/ml. of diphtheria antitoxin.

EXAMPLE 16

An aqueous suspension of dimethyl-dioctadecyl-ammonium iodide containing 1.0 mg./ml. in isotonic borate/succinate buffer pH 7.5 was made and added to an equal volume of diphtheria toxoid solution (10 Lf/ml.) as described in Example 1 to produce a diphtheria vaccine.

When tested in guinea pigs, this vaccine induced a mean titre of 2.5 units/ml. of diphtheria antitoxin.

EXAMPLE 17

An aqueous suspension of dihexadecylamine containing 1.0 mg./ml. in isotonic borate/succinate buffer pH 7.5 was made and added to an equal volume of diphtheria toxoid solution (10 Lf/ml.) as described in Example 1 to produce a diphtheria vaccine.

When tested in guinea pigs, this vaccine showed a significant improvement as compared with a vaccine without the adjuvant.

I claim:

1. In a vaccine comprising a non-pathogenic antigenic material, the improvement characterized in that .05 mg. per ml. to 5 mg. per ml. of an adjuvant is included in the vaccine which is selected from the class consisting of an organic base of the general Formula I

and a salt of the corresponding quaternized cation formed with a group selected from the class consisting of a hydrogen atom, one lower alkyl group and two lower alkyl groups, each of said alkyl groups having from 1 to 3 carbon atoms, wherein A is a higher aliphatic radical having from 12 to 22 carbon atoms, the residue [X] is selected from the class consisting of a nitrogen atom, a residue of the formula

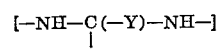

residue of the formula

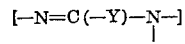

and a residue of the formula

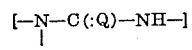

in which Y is selected from the class consisting of a hydrogen atom, NRR, OR′, SR′ and R′, wherein R is selected from the class consisting of a hydrogen atom and lower alkyl of 1 to 3 carbon atoms, R′ being a lower alkyl of 1 to 3 carbon atoms and Q is selected from the class consisting of an oxygen atom, a sulphur atom, an imido and lower alkylimido having from 1 to 3 carbon atoms.

2. A vaccine according to claim 1, in which the non-pathogenic antigenic material is diphtheria toxoid.

3. A vaccine according to claim 1, in which the non-pathogenic antigenic material is tetanus toxoid.

4. A vaccine according to claim 1, in which the non-pathogenic antigenic material is an epsilon toxoid obtained from inactivated *Clostridium perfringens*.

5. A vaccine according to claim 1, in which the non-pathogenic antigenic material is inactivated *Leishmania enriettii*.

6. A vaccine according to claim 1, in which the non-pathogenic antigenic material is *Leishmania tropica major*.

7. A vaccine according to claim 1, in which the non-pathogenic antigenic material is *Trypanosoma congolense*.

8. A vaccine according to claim 1, in which the non-pathogenic antigenic material is *Trypanosoma cruzi*.

9. A vaccine according to claim 1, in which the vaccine contains cations of the formula A—$N(CH_3)_2^+$—A as the chlorides together with sodium chloride (0.5%), propan-2-ol (18%) and water (6.5%) wherein A is selected from the class consisting of 24% hexadecyl +75% octadecyl +1% octadecenyl and 24% hexadecyl +4% octadecyl +30% octadecenyl +42% octadecadienyl.

References Cited

Scwartz et al.: Surface Active Agents and Detergents, vol. II, published by Interscience Publishers, Inc., N.Y., 1958, p. 370.

RICHARD L. HUFF, *Primary Examiner*.

U.S. Cl. X.R.

424—88, 89, 325, 326